US011041133B2

(12) United States Patent
Baralt et al.

(10) Patent No.: US 11,041,133 B2
(45) Date of Patent: Jun. 22, 2021

(54) HYDROCARBON MIXTURE EXHIBITING UNIQUE BRANCHING STRUCTURE

(71) Applicants: Novvi LLC, Emeryville, CA (US); Chevron U.S.A. Inc., San Ramon, CA (US)

(72) Inventors: Eduardo Baralt, Emeryville, CA (US); Cong-Yan Chen, San Ramon, CA (US); Yalin Hao, San Ramon, CA (US); Liwenny Ho, Emeryville, CA (US); Willbe Ho, Emeryville, CA (US); Ajit Pradhan, San Ramon, CA (US); Jason Rosalli, Emeryville, CA (US); Benton Thomas, Emeryville, CA (US); Jason Wells, Emeryville, CA (US)

(73) Assignees: Chevron U.S.A. Inc., San Ramon, CA (US); Novvi LLC, Emeryville, CA (US)

( * ) Notice: Subject to any disclaimer, the term of this patent is extended or adjusted under 35 U.S.C. 154(b) by 4 days.

(21) Appl. No.: 16/398,637

(22) Filed: Apr. 30, 2019

(65) Prior Publication Data

US 2019/0338211 A1   Nov. 7, 2019

Related U.S. Application Data

(60) Provisional application No. 62/665,363, filed on May 1, 2018.

(51) Int. Cl.
*C10M 105/00* (2006.01)
*C09K 5/10* (2006.01)
(Continued)

(52) U.S. Cl.
CPC ............. *C10M 105/00* (2013.01); *C09K 5/10* (2013.01); *C10M 2203/003* (2013.01);
(Continued)

(58) Field of Classification Search
CPC .......... C10M 105/00; C10M 2203/003; C10M 2205/028; C10M 2205/0285;
(Continued)

(56) References Cited

U.S. PATENT DOCUMENTS

| 3,149,178 A | 9/1964 | Hamilton et al. |
| 3,382,291 A | 5/1968 | Brennan |

(Continued)

FOREIGN PATENT DOCUMENTS

| WO | 20120134688 A1 | 10/2012 |
| WO | WO2012134688 A1 * | 10/2012 |

(Continued)

OTHER PUBLICATIONS

International Search Report and Written Opinion dated Jul. 11, 2019 in International Application No. PCT/US2019/029860.
(Continued)

*Primary Examiner* — Taiwo Oladapo
(74) *Attorney, Agent, or Firm* — E. Joseph Gess; Melissa M. Hayworth

(57) ABSTRACT

Provided herein are hydrocarbon mixtures with controlled structure characteristics that address the performance requirements for finished lubricants driven by the stricter environmental and fuel economy regulations. The branching characteristics of the hydrocarbon molecules are controlled to provide a composition that has a unique and superior viscosity-temperature relationship and Noack volatility. An important aspect of the present invention relates to a saturated hydrocarbon mixture with at least 80% of the molecules having an even carbon number, with the branching characteristic of BP/BI in the range≥−0.6037 (Internal alkyl branching)+2.0, where on average at least 0.3 to 1.5 of the internal methyl branches are located more than 4 carbons away from the terminal carbon when analyzed by carbon
(Continued)

NMR. The saturated hydrocarbon mixture with such unique branching structure consistently exhibits a stand out performance in the cold crank simulated viscosity (CCS) vs Noack volatility relationship, which allows for the formulation of lower viscosity engine oils with improved fuel economies.

19 Claims, 4 Drawing Sheets

(51) Int. Cl.
  *C10N 30/00* (2006.01)
  *C10N 40/04* (2006.01)
  *C10N 40/08* (2006.01)
  *C10N 40/26* (2006.01)
  *C10N 40/30* (2006.01)
  *C10N 40/00* (2006.01)
  *C10N 50/10* (2006.01)

(52) U.S. Cl.
  CPC ...... *C10N 2030/74* (2020.05); *C10N 2040/04* (2013.01); *C10N 2040/08* (2013.01); *C10N 2040/135* (2020.05); *C10N 2040/26* (2013.01); *C10N 2040/30* (2013.01); *C10N 2050/10* (2013.01)

(58) Field of Classification Search
  CPC .............. C10M 171/00; C10M 105/04; C10M 107/10; C10M 143/08; C09K 5/10; C10N 2030/74; C10N 2040/04; C10N 2040/08; C10N 2040/26; C10N 2040/30; C10N 2040/135; C10N 2050/10; C10N 2020/065; C10N 2020/015; C10N 2030/08; C10N 2070/00; C10N 2020/011; C10N 2020/071; C10N 2020/02; C10N 2040/25; C10N 2040/252; C10N 2040/12; C10N 2040/16; C10N 2060/02; C10G 2300/30; C10G 2300/302; C10G 2300/304; C10G 2400/10; C10G 50/02; C10G 69/126; C10G 45/58

See application file for complete search history.

(56) References Cited

U.S. PATENT DOCUMENTS

| | | |
|---|---|---|
| 3,742,082 A | 6/1973 | Brennan |
| 3,780,128 A | 12/1973 | Shubkin |
| 4,172,855 A | 10/1979 | Shubkin et al. |
| 4,956,122 A | 9/1990 | Watts et al. |
| 5,082,986 A | 1/1992 | Miller et al. |
| 5,993,644 A | 11/1999 | Xiao et al. |
| 6,090,989 A | 7/2000 | Trewella et al. |
| 6,300,291 B1 | 10/2001 | Hartley et al. |
| 6,420,618 B1 | 7/2002 | Berlowitz et al. |
| 6,974,535 B2 | 12/2005 | Cody et al. |
| 7,083,713 B2 | 8/2006 | Abernathy et al. |
| 7,282,134 B2 | 10/2007 | Abernathy et al. |
| 7,390,763 B2 | 6/2008 | Zones et al. |
| 7,456,329 B2 | 11/2008 | Wu et al. |
| 7,544,850 B2 | 6/2009 | Goze et al. |
| 9,616,419 B2 | 4/2017 | Zhang et al. |
| 9,862,906 B2 | 1/2018 | Ohler et al. |
| 2005/0077208 A1 | 4/2005 | Miller et al. |
| 2008/0156697 A1 | 7/2008 | Dierickx |
| 2011/0192766 A1 | 8/2011 | McCarthy et al. |
| 2014/0323665 A1 | 10/2014 | Skillman et al. |
| 2017/0183583 A1 | 6/2017 | Ide et al. |
| 2017/0240832 A1 | 8/2017 | Hahn et al. |
| 2020/0095177 A1 | 3/2020 | Baralt et al. |

FOREIGN PATENT DOCUMENTS

| | | |
|---|---|---|
| WO | 20160182930 A1 | 11/2016 |
| WO | 20190014533 A1 | 1/2019 |
| WO | 20190014540 A1 | 1/2019 |

OTHER PUBLICATIONS

Netzel, D.A. et al., "1H- and 13C-n.m.r studies on naphtha and light distillate saturate hydrocarbon fractions obtained from in-situ shale oil", Fuel, 60, pp. 307-320 (1981).

* cited by examiner

HYDROCARBON MIXTURE EXHIBITING UNIQUE BRANCHING STRUCTURE

CROSS REFERENCE TO RELATED APPLICATIONS

The present application claims priority to U.S. Provisional Application No. 62/665,363 filed May 1, 2018, the complete disclosure of which is incorporated herein by reference in its entirety.

FIELD OF THE INVENTION

High performance, hydrocarbon mixtures have been developed which possess unique compositional characteristics and which demonstrate superior low temperature and volatility performance.

BACKGROUND OF THE INVENTION

Base stocks are commonly used to produce various lubricants, including lubricating oils for automobiles, industrial oils, turbine oils, greases, metal working fluids, etc. They are also used as process oils, white oils, and heat transfer fluids. Finished lubricants generally consist of two components, base oils and additives. Base oil, which could be one or a mixture of base stocks, is the major constituent in these finished lubricants and contributes significantly to their performances, such as viscosity and viscosity index, volatility, stability, and low temperature performance. In general, a few base stocks are used to manufacture a wide variety of finished lubricants by varying the mixtures of individual base stocks and individual additives.

The American Petroleum Institute (API) categorizes base stocks in five groups based on their saturated hydrocarbon content, sulfur level, and viscosity index (Table 1 below). Group I, II, and III base stocks are mostly derived from crude oil via extensive processing, such as solvent refining for Group I, and hydroprocessing for Group II and Group III. Certain Group III base stocks can also be produced from synthetic hydrocarbon liquids via a Gas-to-Liquids process (GTL), and are obtained from natural gas, coal or other fossil resources. Group IV base stocks, the polyalphaolefins (PAO), are produced by oligomerization of alpha olefins, such as 1-decene. Group V base stocks include everything that does not belong to Groups I-IV, such as naphthenic base stocks, polyalkylene glycols (PAG), and esters. Most of the feedstocks for large-scale base stock manufacturing are non-renewable.

TABLE 1

API Base Oil Classification (API 1509 Appendix E)

| API Group | Viscosity Index (ASTM D2270) | Saturates by ASTM D2007 | Sulphur, % | Description |
|---|---|---|---|---|
| I | 80-120 | <90% | >.03% | Conventional (solvent refining) |
| II | 80-120 | ≥90% | ≤.03% | Hydroprocessing |
| III | ≥120 | ≥90% | ≤.03% | Severe Hydroprocessing |
| IV | | | | PolyAlphaOlefins (PAO) |
| V | | | | All other base stocks not included above e.g. esters |

Automotive engine oils are by far the largest market for base stocks. The automotive industry has been placing more stringent performance specifications on engine oils due to requirements for lower emissions, long drain intervals, and better fuel economy. Specifically, automotive OEMs (original equipment manufacturer) have been pushing for the adoption of lower viscosity engine oils such as 0W-20 to 0W-8, to lower friction losses and achieve fuel economy improvement. Base Oils with a lower Noack Volatility in an engine oil allows the formulation to retain the designed viscosity for longer operation time allowing for increased fuel economy retention and longer drain intervals discussed in U.S. Pat. No. 6,300,291. Group I and Group II's usage in 0W-xx engine oils is highly limited because formulations blended with them cannot meet the performance specifications for 0W-xx engine oils, leading to increased demands for Group III and Group IV base stocks.

Group III base stocks are mostly manufactured from vacuum gas oils (VGOs) through hydrocracking and catalytic dewaxing (e.g. hydroisomerization). Group III base stocks can also be manufactured by catalytic dewaxing of slack waxes originating from solvent refining, or by catalytic dewaxing of waxes originating from Fischer-Tropsch synthesis from natural gas or coal based raw materials also known as Gas to Liquids base oils (GTL).

Manufacturing processes of Group III base stocks from VGOs is discussed in U.S. Pat. Nos. 5,993,644 and 6,974,535. Their boiling point distributions are typically higher when compared to PAOs of the same viscosity, causing them to have higher volatility than PAOs. Additionally, Group III base stocks typically have higher cold crank viscosity (i.e., dynamic viscosity according to ASTM D5293, CCS) than Group IV base stocks at equivalent viscosities.

GTL base stock processing is described in U.S. Pat. Nos. 6,420,618 and 7,282,134, as well as U.S. Patent Application Publication 2008/0156697. For example, the latter publication describes a process for preparing base stocks from a Fischer-Tropsch synthesis product, the fractions of which with proper boiling ranges are subjected to hydroisomerization to produce GTL base stocks.

Such structures and properties of GTL base stocks are described, for example, in U.S. Pat. Nos. 6,090,989 and 7,083,713, as well as U.S. Patent Application Publication 2005/0077208. In U.S. Patent Application Publication 2005/0077208, lubricant base stocks with optimized branching are described, which have alkyl branches concentrated toward the center of the molecules to improve the base stocks' cold flow properties. Nevertheless, pour points for GTL base stocks are typically worse than PAO or other synthetic hydrocarbon base stocks.

A further concern with GTL base stocks is the severely limited commercial supply, a result of the prohibitively large capital requirements for a new GTL manufacturing facility. Access to low cost natural gas is also required to profitably produce GTL base stocks. Furthermore, as GTL base stocks are typically distilled from an isomerized oil with a wide boiling point distribution, the process results in a relatively low yield to the base stock with a desired viscosity when compared to that of a typical PAO process. Due to these monetary and yield constraints there is currently only a single manufacturing plant of group III+GTL base stocks, exposing formulations that use GTL to supply chain and price fluctuation risks.

Polyalphaolefins (PAOs), or Group IV base oils, are produced by the polymerization of alphaolefins in the presence of a Friedel Crafts catalyst such as $AlCl_3$, $BF_3$, or $BF_3$ complexes. For example, 1-octene, 1-decene, and 1-dodecene have been used to manufacture PAOs that have a wide range of viscosities, varying from low molecular weight and low viscosity of about 2 cSt at 100° C., to high molecular weight, viscous materials with viscosities exceeding 100 cSt at 100° C. The polymerization reaction is typically conducted in the absence of hydrogen; the lubricant range products are thereafter polished or hydrogenated to reduce the residual unsaturation. Processes to produce PAO based lubricants are disclosed, for example, in U.S. Pat. Nos. 3,382,291; 4,172,855; 3,742,082; 3,780,128; 3,149,178; 4,956,122; 5,082,986; 7,456,329; 7,544,850; and U.S. Patent Application Publication 2014/0323665. Prior efforts to prepare various PAOs that can meet the increasingly stringent performance requirements of modern lubricants and automotive engine oil particularly have favored low viscosity polyalphaolefin base stocks derived from 1-decene, alone or in some blend with other mineral oils. However, the polyalphaolefins derived from 1-decene can be prohibitively expensive due to its limited supply. Attempts to overcome the availability constraint of 1-decene have led to the production of PAOs from C8 through C12 mixed alpha-olefin feeds, lowering the amount of 1-decene that is needed to impart the properties. However, they still do not completely remove the requirement for providing 1-decene as the predominate olefin feedstock due to performance concerns.

Similarly, previous efforts to use linear alphaolefins in the C14-C20 range made polyalphaolefins with unacceptably high pour points, which are unsuitable for use in a variety of lubricants, including 0W engine oils.

Therefore, there remains a need for a base stock composition having properties within commercially acceptable ranges, for example, for use in automotive and other applications, with such properties including one or more of viscosity, Noack volatility, and low temperature cold-cranking viscosity. Furthermore, there remains a need for base stock compositions having improved properties and methods of manufacture thereof, where the base stock compositions have reduced amounts of 1-decene incorporated therein, and may even preferably eliminate the use of 1-decene in the manufacture thereof.

In addition to the technical demands for the automotive industry, environmental awareness and regulations are driving manufacturers to use renewable feedstocks and raw materials in the production of base stocks and lubricants. It is known that esters and some Group III hydrocarbon base stocks (U.S. Pat. No. 9,862,906B2) of renewable and biological origin have been used in applications such as refrigeration compressor lubricants, hydraulic oils and metal working fluids, and more recently in automotive and industrial lubricants (US20170240832A1). Common biological sources for hydrocarbons are natural oils, which can be derived from plant sources such as canola oil, castor oil, sunflower seed oil, rapeseed oil, peanut oil, soy bean oil, and tall oil, or palm oil. Other commercial sources of hydrocarbons include engineered microorganisms such as Algae or Yeast.

Due to increasing demand for high performing lubricant base stocks there is a continuing need for improved hydrocarbon mixtures. The industry requires these hydrocarbon mixtures to have superior Noack Volatility, and low temperature viscometric properties that can meet stricter engine oil requirements, preferably from renewable sources.

SUMMARY OF THE INVENTION

The present invention relates to a saturated hydrocarbon mixture with well-controlled structural characteristics that address the performance requirements driven by the stricter environmental and fuel economy regulations for automotive engine oils. The branching characteristics of the hydrocarbon molecules are controlled to consistently provide a composition that has a surprising CCS viscosity at −35° C. (ASTM D5329) and Noack volatility (ASTM D5800) relationship.

An important aspect of the present invention relates to a saturated hydrocarbon mixture having greater than 80% of the molecules with an even carbon number according to FIMS, with the mixture exhibiting a branching characteristic of BP/BI≥−0.6037 (Internal alkyl branching per molecule)+ 2.0, and when the hydrocarbon mixture is analyzed by carbon NMR as a whole, has on average at least 0.3 to 1.5 5+ methyl branches per molecule.

One way to synthesize the hydrocarbon mixture disclosed herein is through oligomerization of C14-C20 alpha or internal-olefins, followed by hydroisomerization of the oligomers. Using C14-C20 olefins would ease the demand for high-price 1-decene and other crude oil or synthetic gas based olefins as feedstocks, and making available alternate sources of olefin feedstocks such as those derived from C14-C20 alcohols. The hydrocarbon compositions are derived from one or more olefin co-monomers, where said olefin comonomers are oligomerized to dimers, trimers, and higher oligomers. The oligomers are then subjected to hydroisomerization. The resulting hydrocarbon mixtures have excellent pour point, volatility and viscosity characteristics and additive solubility properties.

A further aspect of the invention is the use of the disclosed saturated hydrocarbon mixture as a base stock for a finished lubricant formulation, where the finished lubricant formulation comprises the saturated hydrocarbon mixture as a base stock, and one or more lubricant or grease additives.

DETAILED DESCRIPTION

Figure 1:
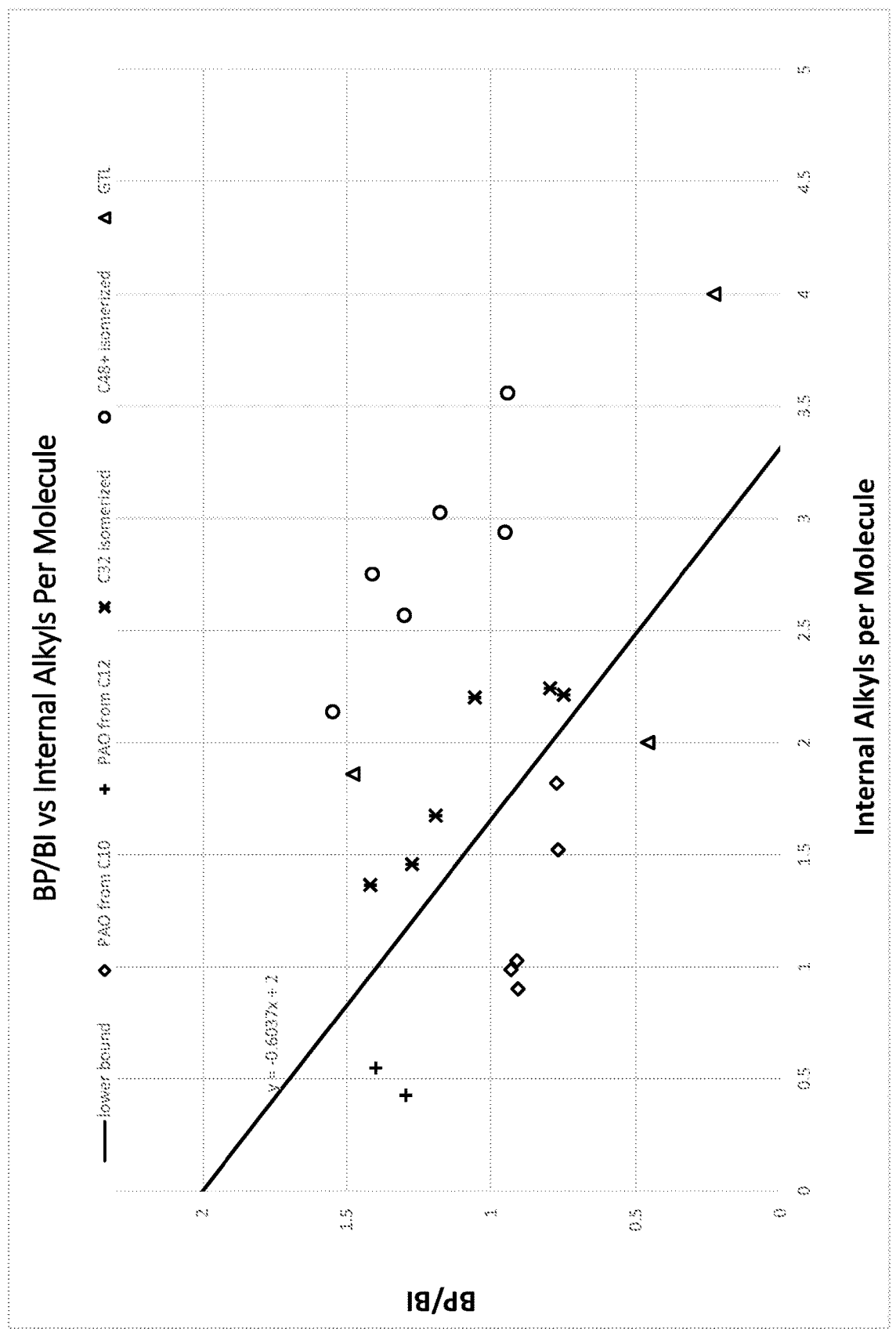
FIG. 1 illustrates the relationship between BP/BI and Internal Alkyl Branches per Molecule for various hydrocarbons, including low-viscosity PAO manufactured from 1-decene and 1-dodecene, GTL base oils, and hydroisomerized hexadecene oligomers. The straight line in the plot depicts the equation of BP/BI=−0.6037 (Internal alkyl branching per molecule)+2.0.

Disclosed herein is a saturated hydrocarbon mixture having a unique branching structure as characterized by NMR that makes it suitable to be used as a high-quality synthetic base stock. The hydrocarbon mixture has outstanding properties including extremely low volatility, good low-temperature properties, etc., which are important performance attributes of high-quality base stocks. To be specific, the mixture comprises greater than 80% of the molecules with an even carbon number according to FIMS. The branching characteristics of the hydrocarbon mixture by NMR comprises a BP/BI in the range≥−0.6037 (Internal alkyl branching per molecule)+2.0. Moreover, on average, at least 0.3 to 1.5 of the internal methyl branches are located more than four carbons away from the end carbon. A saturated hydrocarbon with this unique branching structure exhibits a surprising cold crank simulated viscosity (CCS) vs. Noack volatility relationship that is beneficial for blending low-viscosity automotive engine oils.

In one embodiment, the hydrocarbon mixtures described herein are the product of oligomerization of olefins and a subsequent hydroisomerization. C14 to C20 olefins are oligomerized to form an oligomer distribution consisting of unreacted monomer, dimers (C28-C40), and trimers and higher oligomers (≥C42). The unreacted monomers are distilled off for possible re-use in a subsequent oligomerization. The remaining oligomers are then hydroisomerized to achieve the final branching structures described herein which consistently impart a surprising cold crank simulated viscosity (CCS) vs. Noack volatility relationship.

Definition of Hydrocarbon Properties

The following properties are used in describing the novel saturated hydrocarbon mixtures:

Viscosity is the physical property that measures the fluidity of the base stock. Viscosity is a strong function of temperature. Two commonly used viscosity measurements are dynamic viscosity and kinematic viscosity. Dynamic viscosity measures the fluid's internal resistance to flow. Cold cranking simulator (CCS) viscosity at −35° C. for engine oil is an example of dynamic viscosity measurements. The SI unit of dynamic viscosity is Pa·s. The traditional unit used is centipoise (cP), which is equal to 0.001 Pa·s (or 1 m Pa·s). The industry is slowly moving to SI units. Kinematic viscosity is the ratio of dynamic viscosity to density. The SI unit of kinematic viscosity is $mm^2/s$. The other commonly used units in industry are centistokes (cSt) at 40° C. (KV40) and 100° C. (KV100) and Saybolt Universal Second (SUS) at 100° F. and 210° F. Conveniently, 1 $mm^2/s$ equals 1 cSt. ASTM D5293 and D445 are the respective methods for CCS and kinematic viscosity measurements.

Viscosity Index (VI) is an empirical number used to measure the change in the base stock's kinematic viscosity as a function of temperature. The higher the VI, the less relative change is in viscosity with temperature. High VI base stocks are desired for most of the lubricant applications, especially in multigrade automotive engine oils and other automotive lubricants subject to large operating temperature variations. ASTM D2270 is a commonly accepted method to determine VI.

Pour point is the lowest temperature at which movement of the test specimen is observed. It is one of the most important properties for base stocks as most lubricants are designed to operate in the liquid phase. Low pour point is usually desirable, especially in cold weather lubrication. ASTM D97 is the standard manual method to measure pour point. It is being gradually replaced by automatic methods, such as ASTM D5950 and ASTM D6749. ASTM D5950 with 1° C. testing interval is used for pour point measurement for the examples in this patent.

Volatility is a measurement of oil loss from evaporation at an elevated temperature. It has become a very important specification due to emission and operating life concerns, especially for lighter grade base stocks. Volatility is dependent on the oil's molecular composition, especially at the front end of the boiling point curve. Noack (ASTM D5800) is a commonly accepted method to measure volatility for automotive lubricants. The Noack test method itself simulates evaporative loss in high temperature service, such as an operating internal combustion engine.

Boiling point distribution is the boiling point range that is defined by the True Boiling Points (TBP) at which 5% and 95% materials evaporates. It is measured by ASTM D2887 herein.

NMR Branching Analysis

Branching parameters measured by NMR spectroscopy for the hydrocarbon characterization include:

Branching Index (BI): the percentage of methyl hydrogens appearing in the chemical shift range of 0.5 to 1.05 ppm among all hydrogens appearing in the 1H NMR chemical range 0.5 to 2.1 ppm in an isoparaffinic hydrocarbon.

Branching Proximity (BP): the percentage of recurring methylene carbons which are four or more number of carbon atoms removed from an end group or branch appearing at $^{13}$C NMR chemical shift 29.8 ppm.

Internal Alkyl Carbons: is the number of methyl, ethyl, or propyl carbons which are three or more carbons removed from end methyl carbons, that includes 3-methyl, 4-methyl, 5+ methyl, adjacent methyl, internal ethyl, n-propyl and unknown methyl appearing between $^{13}$C NMR chemical shift 0.5 ppm and 22.0 ppm, except end methyl carbons appearing at 13.8 ppm.

5+ Methyl Carbons: is the number of methyl carbons attached to a methine carbon which is more than four carbons away from an end carbon appearing at 13C NMR chemical shift 19.6 ppm in an average isoparaffinic molecule.

The NMR spectra were acquired using Bruker AVANCE 500 spectrometer using a 5 mm BBI probe. Each sample was mixed 1:1 (wt:wt) with $CDCl_3$. The $^1$H NMR was recorded at 500.11 MHz and using a 9.0 μs (30°) pulse applied at 4 s intervals with 64 scans co-added for each spectrum. The $^{13}$C NMR was recorded at 125.75 MHz using a 7.0 μs pulse and with inverse gated decoupling, applied at 6 sec intervals with 4096 scans co-added for each spectrum. A small amount of 0.1 M $Cr(acac)_3$ was added as a relaxation agent and TMS was used as an internal standard.

The branching properties of the lubricant base stock samples of the present invention are determined according to the following six-step process. Procedure is provided in detail in US 20050077208 A1, which is incorporated herein in its entirety. The following procedure is slightly modified to characterize the current set of samples:

1) Identify the CH branch centers and the $CH_3$ branch termination points using the DEPT Pulse sequence (Doddrell, D. T.; D. T. Pegg; M. R. Bendall, Journal of Magnetic Resonance 1982, 48, 323ff.).

2) Verify the absence of carbons initiating multiple branches (quaternary carbons) using the APT pulse sequence (Patt, S. L.; J. N. Shoolery, Journal of Magnetic Resonance 1982, 46, 535ff.).

3) Assign the various branch carbon resonances to specific branch positions and lengths using tabulated and calculated values (Lindeman, L. P., Journal of Qualitative Analytical Chemistry 43, 1971 1245ff; Netzel, D. A., et. al., Fuel, 60, 1981, 307ff.).
Branch NMR Chemical Shift (ppm)

TABLE 2

Describes ppm shift of alkyl branching by Carbon NMR

| Branch | NMR Chemical Shift (ppm) |
|---|---|
| 2-methyl | 22.5 |
| 3-methyl | 19.1 or 11.4 |
| 4-methyl | 14.0 |
| 5+ methyl | 19.6 |
| Internal ethyl | 10.8 |
| n-propyl | 14.4 |
| Adjacent methyl | 16.7 |

4) Quantify the relative frequency of branch occurrence at different carbon positions by comparing the integrated intensity of its terminal methyl carbon to the intensity of a single carbon (total integral/number of carbons per molecule in the mixture). For example, number of 5+ methyl branches per molecule is calculated from the signal intensity at a chemical shift of 19.6 ppm relative to intensity of a single carbon.

For the unique case of the 2-methyl branch, where both the terminal and the branch methyl occur at the same resonance position, the intensity was divided by two before doing the frequency of branch occurrence calculation.

If the 4-methyl branch fraction is calculated and tabulated, its contribution to the 5+ methyls must be subtracted to avoid double counting.

Unknown methyl branches are calculated from contribution of signals that appear between 5.0 ppm and 22.5 ppm, however not including any branches reported in Table 2.

5) Calculate the Branching Index (BI) and Branching Proximity (BP) using the calculations described in U.S. Pat. No. 6,090,989, which is incorporated by reference herein in its entirety.

6) Calculate the total internal alkyl branches per molecule by adding up the branches found in steps 3 and 4, except the 2-methyl branches. These branches would include 3-methyl, 4-methyl, 5+ methyl, internal ethyl, n-propyl, adjacent methyl and unknown methyl.

FIMS Analysis: The hydrocarbon distribution of the current invention is determined by FIMS (field ionization mass spectroscopy). FIMS spectra were obtained on a Waters GCT-TOF mass spectrometer. The samples were introduced via a solid probe, which was heated from about 40° C. to 500° C. at a rate of 50° C. per minute. The mass spectrometer was scanned from m/z 40 to m/z 1000 at a rate of 5 seconds per decade. The acquired mass spectra were summed to generate one averaged spectrum which provides carbon number distribution of paraffins and cycloparaffins containing up to six rings.

Hydrocarbon Structure and Properties

The structure of the hydrocarbon mixtures disclosed herein are characterized by FIMS and NMR. FIMS analysis demonstrate that more than 80% of the molecules in the hydrocarbon mixtures have an even carbon number.

The unique branching structure of the hydrocarbon mixtures disclosed herein are characterized by NMR parameters, such as BP, BI, internal alkyl branching, and 5+ methyls. BP/BI of the hydrocarbon mixtures are in the range of ≥−0.6037 (Internal alkyl branching per molecule)+2.0. The 5+ methyls of the hydrocarbon mixtures average from 0.3 to 1.5 per molecule.

The hydrocarbon mixture can be classified into two carbon ranges based on the carbon number distribution, C28 to C40 carbons, and greater than or equal to C42. Generally, about or greater than 95% of the molecules present in each hydrocarbon mixture have carbon numbers within the specified range. Representative molecular structures for the C28 to C40 range can be proposed based on the NMR and FIMS analysis. Without wishing to be bound to any one particular theory, it is believed that the structures made by oligomerization and hydroisomerization of olefins has methyl, ethyl, butyl branches distributed throughout the structure and the branch index and branch proximity contribute to the surprisingly good low temperature properties of the product. Exemplary structures in the present hydrocarbon mixture are as follows:

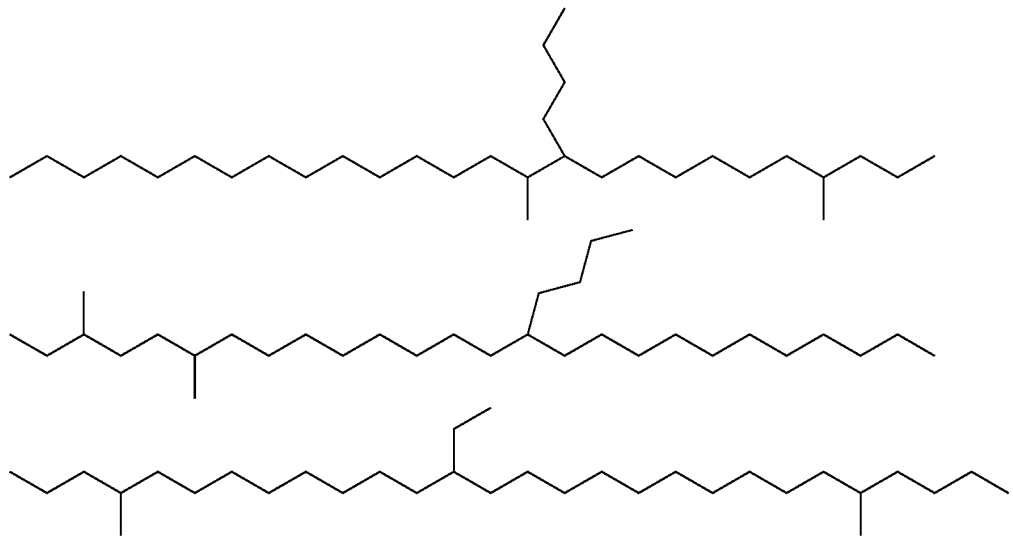

Figure 3:
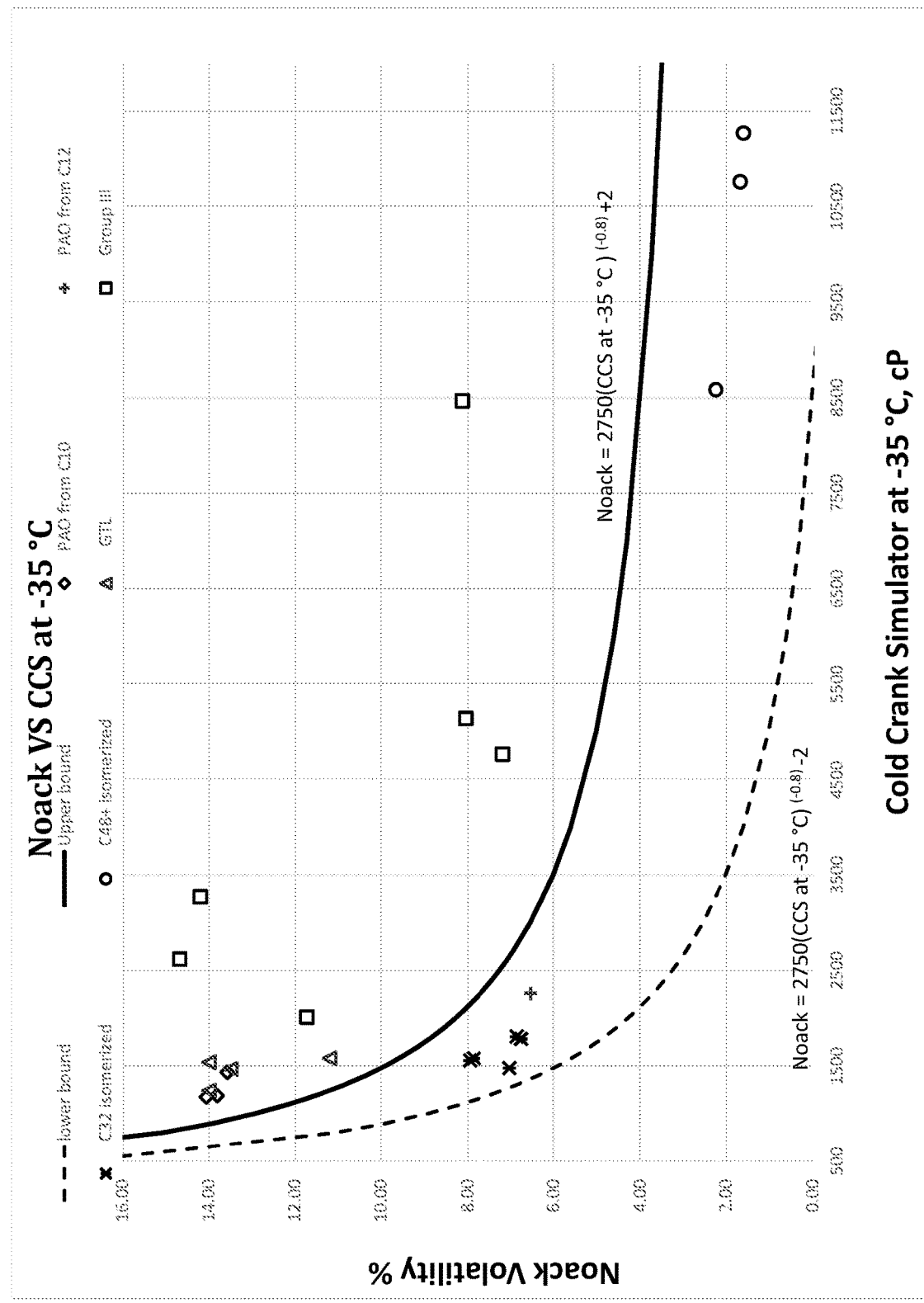
FIG. 3 illustrates the relationship between NOACK volatility and CCS at −35° C. for various hydrocarbons, including low-viscosity PAO manufactured from 1-decene and 1-dodecene, GTL base oils, Group III base oils, and hydroisomerized hexadecene oligomers. The solid line and dotted line depicts the upper limit and lower limit of the Noack vs. CCS at −35° C. exhibited by the present unique hydrocarbon mixture, which are NOACK=2,750 (CCS at −35° C.)$^{(-0.8)}$+2 and NOACK=2,750 (CCS at −35° C.)$^{(-0.8)}$−2, respectively.
Figure 4:
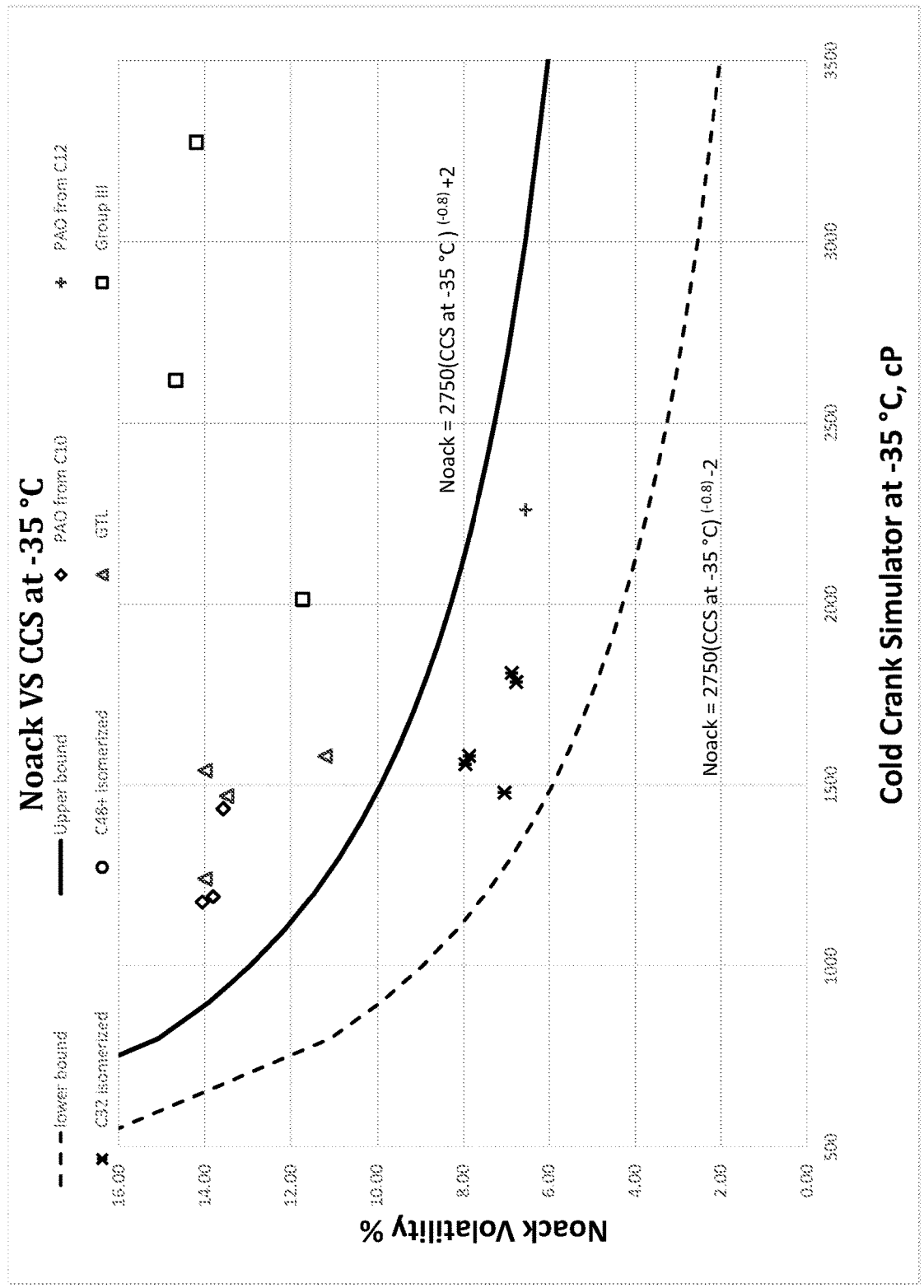
FIG. 4 is an enlarged view of FIG. 3 in the range of 800-2,800 cP of CCS at −35° C.

The unique branching structure and narrow carbon distribution of the hydrocarbon mixtures makes them suitable to be used as high-quality synthetic base oils, especially for low-viscosity engine oil applications. The hydrocarbon mixtures exhibit:
- a KV100 in the range of 3.0-10.0 cSt;
- a pour point in the range of −20 to −55° C.;
- a Noack and CCS at −35° C. relationship such that Noack is between 2750 (CCS at −35° C.)$^{(-0.8)}$±2;

The Noack and CCS relationship for the hydrocarbon mixtures are shown in FIGS. 3 and 4. In each figure, the top line represents Noack=2750 (CCS at −35° C.)$^{(-0.8)}$+2 and the bottom graph line represents Noack=2750 (CCS at −35° C.)$^{(-0.8)}$−2. More preferably the hydrocarbon mixtures have a Noack and CCS at −35 C relationship such that the Noack is between Noack=2750 (CCS at −35° C.)$^{(-0.8)}$+0.5 and Noack=2750 (CCS at −35° C.)$^{(-0.8)}$−2. Hydrocarbon mixtures that are closer to the origin in FIGS. 3 and 4 have been found more advantageous for low viscosity engine oils due to the low volatility and decreased viscosity at −35° C.

A hydrocarbon mixture in accordance with the present invention with carbon numbers in the range of C28 to C40, and in another embodiment carbon numbers in the range of from C28 to C36, or in another embodiment molecules with a carbon number of C32, will generally exhibit the following characteristics in addition to the characteristics of BP/BI, Internal alkyl branches per molecule, 5+ methyl branches per molecule, and Noack/CCS relationship described above:
- a KV100 in the range of 3.0-6.0 cSt;
- a VI in the range of 11 ln(BP/BI)+135 to 11 ln(BP/BI)+145; and
- a pour point in the range of 33 ln(BP/BI)−45 to 33 ln(BP/BI)−35.

In one embodiment, the KV100 for the C28-C40 hydrocarbon mixture ranges from 3.2 to 5.5 cSt; in another embodiment the KV100 ranges from 4.0 to 5.2 cSt; and from 4.1 to 4.5 cSt in another embodiment.

The VI for the C28-C40 hydrocarbon mixture ranges from 125 to 155 in one embodiment and from 135 to 145 in another embodiment.

The Pour Point of the hydrocarbon mixture, in one embodiment ranges from 25 to −55° C. and from 35 to −45° C. in another embodiment.

The boiling point range of the C28-C40 hydrocarbon mixture in one embodiment is no greater than 125° C. (TBP at 95%-TBP at 5%) as measured by ASTM D2887; no greater than 100° C. in another embodiment; no greater than 75° C. in one embodiment; no greater than 50° C. in another embodiment; and no greater than 30° C. in one embodiment. In the preferred embodiments, those with a boiling point range no greater than 50° C., and even more preferably no greater than 30° C., give a surprisingly low Noack Volatility (ASTM D5800) for a given KV100.

The C28-C40 hydrocarbon mixture in one embodiment has a Branching Proximity (BP) in the range of 14-30 with a Branching Index (BI) in the range of 15-25; and in another embodiment a BP in the range of 15-28 and a BI in the range of 16-24.

The Noack volatility (ASTM D5800) of the C28-C40 hydrocarbon mixture is less than 16 wt % in one embodiment; less than 12 wt % in one embodiment; less than 10 wt % in one embodiment; less than 8 wt % in one embodiment and less than 7 wt % in one embodiment. The C28-C40 hydrocarbon mixture in one embodiment also has a CCS viscosity at −35° C. of less than 2700 cP; of less than 2000 cP in another embodiment; of less than 1700 cP in one embodiment; and less than 1500 cP in one embodiment.

The hydrocarbon mixture with the carbon number range of C42 and greater will generally exhibit the following characteristics, in addition to the characteristics of BP/BI, internal alkyl branches per molecule, 5+ methyl branches per molecule, and Noack and CCS at −35° C. relationship described above:
- a KV100 in the range of 6.0-10.0 cSt;
- a VI in the range of 11 ln(BP/BI)+145 to 11 ln(BP/BI)+160; and
- a Pour Point in the range of 33 ln(BP/BI)−40 to 33 ln(BP/BI)−25.

The hydrocarbon mixture comprising C42 carbons or greater, in one embodiment has a KV100 in the range of 8.0 to 10.0 cSt, and in another embodiment from 8.5 to 9.5 cSt.

The VI of the hydrocarbon mixture having ≥42 carbons is 140-170 in one embodiment; and, from 150-160 in another embodiment.

The pour point in one embodiment ranges from −15 to −50° C.; and, from −20 to −40° C. in another embodiment.

In one embodiment, the hydrocarbon mixture comprising ≥42 carbons has a BP in the range of 18-28 with a BI in the range of 17-23. In another embodiment, the hydrocarbon mixture has a BP in the range of 18-28 and a BI in the range of 17-23.

In general, both hydrocarbon mixtures disclosed above exhibit the following characteristics:
- at least 80% of the molecules have an even carbon number according to FIMS;
- a KV100 in the range of 3.0-10.0 cSt;
- a pour point in the range of −20 to −55° C.;
- a Noack and CCS @ −35° C. relationship such that Noack is between 2750 (CCS @−35° C.)$^{(-0.8)}$±2;
- a BP/BI in the range of ≥−0.6037 (Internal alkyl branching)+2.0 per molecule; and,
- on average from 0.3 to 1.5 5+ methyl branches per molecule.

Synthesis

Provided herein are possible processes or methods to make the disclosed hydrocarbon mixtures. The novel hydrocarbon mixtures disclosed herein can be synthesized via olefin oligomerization to achieve the desired carbon chain length, followed by hydroisomerization to improve their cold-flow properties, such as pour point and CCS, etc. In one embodiment, olefins of C14 to C20 in length are oligomerized using an acid catalyst to form an oligomer mixture. The olefins can be sourced from natural occurring molecules, such as crude oil or gas based olefins, or from ethylene polymerizations. In some variations, about 100% of the carbon atoms in the olefin feedstocks described herein may originate from renewable carbon sources. For example, an alpha-olefin co-monomer may be produced by oligomerization of ethylene derived from dehydration of ethanol produced from a renewable carbon source. In some variations, an alpha-olefin co-monomer may be produced by dehydration of a primary alcohol other than ethanol that is produced from a renewable carbon source. Said renewable alcohols can be dehydrated into olefins, using gamma alumina or sulfuric acid. In some embodiments, modified or partially hydrogenated terpene feedstocks derived from renewable resources are coupled with one or more olefins that are derived from renewable resources.

In one embodiment, an olefin monomer between C14 to C20 is oligomerized in the presence of $BF_3$ and/or $BF_3$ promoted with a mixture of an alcohol and/or an ester, such as a linear alcohol and an alkyl acetate ester, using a continuously stirred tank reactor (CSTR) with an average residence time of 60 to 400 minutes. In another embodiment, the C14 to C20 olefin monomers are oligomerized in the presence of $BF_3$ and/or promoted $BF_3$ using a continuously stirred tank reactor with an average residence time of 90 to 300 minutes. In yet another embodiment, the C14 to C20 olefin monomers are oligomerized in the presence of $BF_3$ and/or promoted $BF_3$ using a continuously stirred tank reactor with an average residence time of 120 to 240 minutes. The temperature of the oligomerization reaction may be in a range of from 10° C. to 90° C. However, in one preferred embodiment, the temperature is maintained in the range of from 15 to 75° C., and most preferably 20° C. to 40° C., for the duration of the reaction.

Suitable Lewis acids catalysts for the oligomerization process include metalloid halides and metal halides typically used as Friedel-Crafts catalysts, e.g., $AlCl_3$, $BF_3$, $BF_3$ complexes, $BCl_3$, $AlBr_3$, $TiCl_3$, $TiCl_4$, $SnCl_4$, and $SbCl_5$. Any of the metalloid halide or metal halide catalysts can be used with or without a co-catalyst protic promoter (e.g., water, alcohol, acid, or ester). In one embodiment, the oligomerization catalyst is selected from the group consisting of zeolites, Friedel-Crafts catalysts, Bronsted acids, Lewis acids, acidic resins, acidic solid oxides, acidic silica aluminophosphates, Group IVB metal oxides, Group VB metal oxides, Group VIB metal oxides, hydroxide or free metal forms of Group VIII metals, and any combination thereof.

Proper control of the oligomerization reaction temperature and residence time within a CSTR is needed to ensure the dimer portion (C28-C40) of the oligomerization product has branching proximity (BP) between 25 to 35, preferably between 27-35, more preferably between 27-33, and most preferably between 28-32, if the dimer portion were to be saturated without isomerization to a Br index of less than 100 mg $Br_2$/100 g (ASTM D2710). A branching proximity which is too low prior to hydroisomerization will lead to isomerized hydrocarbon mixtures that fall under the solid line in FIG. 1 and will result in a less desirable higher CCS viscosity at −35° C. value for a given Noack volatility to fit within the range shown in FIGS. 3 and 4. Conversely, a branching proximity which is too high will require greater isomerization to reach an acceptable pour point, which will increase the Noack volatility and the CCS at −35° C. simultaneously. In one embodiment, the unsaturated oligomer product is distilled to remove the unreacted monomer. For example, the unreacted monomer may be separated from the oligomer product, such as via distillation, and can be recycled back into the mixture of the first and/or second feedstocks for oligomerization thereof.

The oligomer product is then hydroisomerized to provide the additional internal alkyl branches required to achieve the ideal branching characteristics. In one embodiment, the whole oligomer product, including both the dimers (C28-C40) and heavier oligomers (≥C42), are hydroisomerized prior to separation by distillation. The hydroisomerized product is then separated into the final hydrocarbon products by distillation. In another embodiment, the dimers and heavier oligomers are fractionated and hydroisomerized separately.

Hydroisomerization catalysts useful in the present invention usually comprises a shape-selective molecular sieve, a metal or metal mixture that is catalytically active for hydrogenation, and a refractory oxide support. The presence of a hydrogenation component leads to product improvement, especially VI and stability. Typical catalytically active hydrogenation metals include chromium, molybdenum, nickel, vanadium, cobalt, tungsten, zinc, platinum, and palladium. Platinum and palladium are especially preferred, with platinum mostly preferred. If platinum and/or palladium is used, the metal content is typically in the range of 0.1 to 5 weight percent of the total catalyst, usually from 0.1 to 2 weight percent, and not to exceed 10 weight percent. Hydroisomerization catalysts are discussed, for example, in U.S. Pat. Nos. 7,390,763 and 9,616,419, as well as U.S. Patent Application Publications 2011/0192766 and 2017/0183583.

The conditions for hydroisomerization are tailored to achieve an isomerized hydrocarbon mixture with specific branching properties, as described above, and thus will depend on the characteristics of feed used. The reaction temperature is generally between about 200° C. and 400° C., preferably between 260° C. to 370° C., most preferably between 288° C. to 345° C., at a liquid hourly space velocity (LHSV) generally between about 0.5 $hr^{-1}$ and about 20 $hr^{-1}$. The pressure is typically from about 15 psig to about 2500 psig, preferably from about 50 psig to about 2000 psig, more preferably from about 100 psig to about 1500 psig. Low pressure provides enhanced isomerization selectivity, which results in more isomerization and less cracking of the feed, thus leading to an increased yield.

Hydrogen is present in the reaction zone during the hydroisomerization process, typically in a hydrogen to feed ratio from about 0.1 to 10 MSCF/bbl (thousand standard cubic feet per barrel), preferably from about 0.3 to about 5 MSCF/bbl. Hydrogen may be separated from the product and recycled to the reaction zone.

In one embodiment, an additional step of hydrogenation is added before the hydroisomerization to protect the downstream hydroisomerization catalyst. In another embodiment, an additional step of hydrogenation or hydrofinishing is added after the hydroisomerization to further improve the saturation and stability of the hydrocarbon mixture.

The hydroisomerized hydrocarbon mixtures are comprised of dimers having carbon numbers in the range of C28-C40, and a mixture of trimers+ having carbon numbers of C42 and greater. Each of the hydrocarbon mixtures will exhibit a BP/BI in the range of ≥−0.6037 (internal alkyl branching)±2.0 per molecule, and, on average, from 0.3 to 1.5 methyl branches on the fifth or greater position per molecule. Importantly, at least 80% of the molecules in each composition also have an even carbon number as determined by FIMS. In another embodiment, each of the hydrocarbon compositions will also exhibit a Noack and CCS at −35° C. relationship such that the Noack is between 2750 (CCS at −35° C.)$^{(-0.8)}$±2. These characteristics allow for the formulation of low-viscosity engine oils as well as many other high-performance lubricant products.

In one embodiment, C16 olefins are used as the feed for the oligomerization reaction. When using C16 olefins as the feed, the hydroisomerized dimer product generally exhibits a KV100 of 4.3 cSt with <8% Noack loss and a CCS at −35° C. of approximately 1,700 cP. The extremely low Noack volatility is due to the high starting boiling point and narrow boiling point distribution when compared other 3.9 to 4.4 cSt synthetic base stocks. This makes it ideal for use in low viscosity engine oils with strict volatility requirements. The excellent CCS and pour point characteristics are due to the branching characteristics discussed above. In one embodiment, the material has a pour point of ≤−40° C. This is required to pass critical engine oil formulation requirements for 0W formulations, including Mini-Rotary Viscosity (ASTM D4684) and Scanning Brookfield Viscosity (ASTM D2983) specifications.

Lubricant Formulations

The hydrocarbon mixtures disclosed herein can be used as lubricant base stocks to formulate final lubricant products comprising additives. In certain variations, a base stock prepared according to the methods described herein is blended with one or more additional base stocks, e.g., one or more commercially available PAOs, a Gas to Liquid (GTL) base stock, one or more mineral base stocks, a vegetable oil base stock, an algae-derived base stock, a second base stock as described herein, or any other type of renewable base stock. Any effective amount of additional base stock may be added to reach a blended base oil having desired properties. For example, blended base oils can comprise a ratio of a first base stock as described herein to a second base stock (e.g., a commercially available base oil PAO, a GTL base stock, one or more mineral base stocks, a vegetable oil base stock, an algae derived base stock, a second base stock as described herein) that is about is from about 1-99%, from about 1-80%, from about 1-70%, from about 1-60%, from about 1-50%, from about 1-40%, from about 1-30%, from about 1-20%, or from about 1-10%, based on the total weight of the composition may be made.

Also disclosed herein are lubricant compositions comprising a hydrocarbon mixture described herein. In some variations, the lubricant compositions comprise a base oil comprising at least a portion of a hydrocarbon mixture produced by any of the methods described herein, and one or more additives selected from the group of antioxidants, viscosity modifiers, pour point depressants, foam inhibitors, detergents, dispersants, dyes, markers, rust inhibitors or other corrosion inhibitors, emulsifiers, de-emulsifiers, flame retardants, antiwear agents, friction modifiers, thermal stability improvers, multifunctional additives (e.g., an additive that functions as both an antioxidant and a dispersant) or any combination thereof. Lubricant compositions may comprise hydrocarbon mixtures described herein and any lubricant additive, combination of lubricant additives, or available additive package.

Any of the compositions described herein that are used as a base stock may be present at greater than about 1% based on the total weight of a finished lubricant composition. In certain embodiments, the amount of the base stock in the formulation is greater than about 2, 5, 15 or 20 wt % based on the total weight of the formulation. In some embodiments, the amount of the base oil in the composition is from about 1-99%, from about 1-80%, from about 1-70%, from about 1-60%, from about 1-50%, from about 1-40%, from about 1-30%, from about 1-20%, or from about 1-10% based on the total weight of the composition. In certain embodiments, the amount of base stock in formulations provided herein is about 1%, 5%, 7%, 10%, 13%, 15%, 20%, 30%, 40%, 50%, 60%, 70%, 80%, 90%, or 99% based on total weight of the formulation.

As is known in the art, types and amounts of lubricant additives are selected in combination with a base oil so that the finished lubricant composition meets certain industry standards or specifications for specific applications. In general, the concentration of each of the additives in the composition, when used, may range from about 0.001 wt. % to about 20 wt. %, from about 0.01 wt. % to about 10 wt. %, from about 0.1 wt. % to about 5 wt. % or from about 0.1 wt. % to about 2.5 wt. %, based on the total weight of the composition. Further, the total amount of the additives in the composition may range from about 0.001 wt. % to about 50 wt. %, from about 0.01 wt % to about 40 wt %, from about 0.01 wt % to about 30 wt %, from about 0.01 wt. % to about 20 wt. %), from about 0.1 wt. % to about 10 wt. %, or from about 0.1 wt. % to about 5 wt. %, based on the total weight of the composition.

In some variations, the base oils described herein are formulated in lubricant compositions for use as two cycle engine oils, as transmission oils, as hydraulic fluids, as compressor oils, as turbine oils and greases, as automotive engine oils, as gear oils, as marine lubricants, and as process oils. Process oils applications include but are not limited to: rolling mill oils, coning oils, plasticizers, spindle oils, polymeric processing, release agents, coatings, adhesives, sealants, polish and wax blends, drawing oils, and stamping oils, rubber compounding, pharmaceutical process aids, personal care products, and inks.

In yet other variations, the base oils described herein are formulated as industrial oil or grease formulations comprising at least one additive selected from anti-oxidants, anti-wear agents, extreme pressure agents, defoamants, detergent/dispersant, rust and corrosion inhibitors, thickeners, tackifiers, and demulsifiers. It is also contemplated that the base stocks of the invention may be formulated as dielectric heat transfer fluids composed of relatively pure blends of compounds selected from aromatic hydrocarbons, polyalphaolefins, polyol esters, and natural vegetable oils, along with additives to improve pour point, increase stability and reduce oxidation rate.

The present invention will be further illustrated by the following examples, which are not intended to be limiting.

EXAMPLES

Examples 1-6 (C28-C40 Hydrocarbon Mixtures)

Example 1

1-Hexadecene with less than 8% branched and internal olefins was oligomerized under $BF_3$ with a co-catalyst composition of Butanol and Butyl Acetate. The reaction was held at 20° C. during semi-continuous addition of olefins and co-catalyst. The residence time was 90 minutes. The unreacted monomer was then distilled off, leaving behind less than 0.1% monomer distillation bottoms. A subsequent distillation was performed to separate the dimer from the trimer+ with less than 5% trimer remained in the dimer cut.

The dimers were then hydroisomerized with a noble-metal impregnated aluminoslicate of MRE structure type catalyst bound with alumina. The reaction was carried out in a fixed bed reactor at 500 psig and 307° C. Cracked molecules were separated from the hydroisomerized C16 dimer using an online stripper.

Example 2

The oligomerization and subsequent distillation were performed identically to Example 1. The dimers were then hydroisomerized with a noble-metal impregnated aluminoslicate of MRE structure type catalyst bound with alumina. The reaction was carried out in a fix bed reactor at 500 psig and 313° C. Cracked molecules were separated from the hydroisomerized C16 dimers using an online stripper.

Example 3

The oligomerization and subsequent distillation were performed identically to Example 1. The dimers were then hydroisomerized with a noble-metal impregnated aluminoslicate of MRE structure type catalyst bound with alumina. The reaction was carried out in a fix bed reactor at 500 psig and 324° C. Cracked molecules were separated from the hydroisomerized C16 dimers using an online stripper.

Example 4

The oligomerization and subsequent distillation were performed identically to Example 1. The dimers were then hydroisomerized with a noble-metal impregnated aluminoslicate of MTT structure type catalyst bound with alumina. The reaction was carried out in a fix bed reactor at 500 psig and 316° C. Cracked molecules were separated from the hydroisomerized C16 dimers using an online stripper.

Example 5

The oligomerization and subsequent distillation were performed identically to Example 1. The dimers were then hydroisomerized with a noble-metal impregnated aluminoslicate of MTT structure type catalyst bound with alumina. The reaction was carried out in a fix bed reactor at 500 psig and 321° C. Cracked molecules were separated from the hydroisomerized C16 dimers using an online stripper.

Example 6

The oligomerization and subsequent distillation were performed identically to Example 1. The dimers were then hydroisomerized with a noble-metal impregnated aluminoslicate of MTT structure type catalyst bound with alumina. The reaction was carried out in a fix bed reactor at 500 psig and 332° C. Cracked molecules were separated from the hydroisomerized C16 dimers using an online stripper.

Examples 7-12 (C≥42 Hydrocarbon Mixtures)

Example 7

1-Hexadecene with less than 8% branched and internal olefins was oligomerized under $BF_3$ with a co-catalyst composition of Butanol and Butyl Acetate. The reaction was held at 20° C. during semi-continuous addition of olefins and co-catalyst. The residence time was 90 minutes. The unreacted monomer was then distilled off, leaving behind less than 0.1% monomer distillation bottoms. A subsequent distillation was performed to separate the dimer from the trimer and higher oligomers, the resulting dimer has less than 5% trimer.

The trimer and higher oligomers (trimer+) cut was then hydroisomerized with a noble-metal impregnated aluminoslicate of MRE structure type catalyst bound with alumina. The reaction was carried out in a fixed bed reactor at 500 psig and 313° C. Cracked molecules were separated from the hydroisomerized C16 trimer+ using an online stripper.

Example 8

The oligomerization and subsequent distillations were performed identically to Example 7. The trimer+ cut was then hydroisomerized with a noble-metal impregnated aluminoslicate of MRE structure type catalyst bound with alumina. The reaction was carried out in a fix bed reactor at 500 psig and 318° C. Cracked molecules were separated from the hydroisomerized C16 trimer+ using an online stripper.

Example 9

The oligomerization and subsequent distillations were performed identically to Example 7. The trimer+ cut was then hydroisomerized with a noble-metal impregnated aluminoslicate of MRE structure type catalyst bound with alumina. The reaction was carried out in a fix bed reactor at 500 psig and 324° C. Cracked molecules were separated from the hydroisomerized C16 trimer+ using an online stripper.

Example 10

The oligomerization and subsequent distillations were performed identically to Example 7. The trimer+ cut was then hydroisomerized with a noble-metal impregnated aluminoslicate of MTT structure type catalyst bound with alumina. The reaction was carried out in a fix bed reactor at 500 psig and 321° C. Cracked molecules were separated from the hydroisomerized C16 trimer+ using an online stripper.

Example 11

The oligomerization and subsequent distillations were performed identically to Example 7. The trimer+ cut was then hydroisomerized with a noble-metal impregnated aluminoslicate of MTT structure type catalyst bound with alumina. The reaction was carried out in a fix bed reactor at 500 psig and 327° C. Cracked molecules were separated from the hydroisomerized C16 trimer+ using an online stripper.

Example 12

The oligomerization and subsequent distillations were performed identically to Example 7. The trimer+ cut was then hydroisomerized with a noble-metal impregnated aluminoslicate of MTT structure type catalyst bound with alumina. The reaction was carried out in a fix bed reactor at 500 psig and 332° C. Cracked molecules were separated from the hydroisomerized C16 trimer+ using an online stripper.

Inspection results for the hydrocarbon mixtures obtained in examples 1-12 are summarized in Table 3 below.

TABLE 3

| Example | BP/BI | Internal Alkyl | 5+ Methyl | KV40, cSt | KV100, cSt | VI | Noack, wt % | Pour Point (° C.) | CCS at −35° C., cP |
|---|---|---|---|---|---|---|---|---|---|
| No. 1 | 1.42 | 1.36 | 0.32 | 18.57 | 4.306 | 144 | 6.9 | −30 | 1809 |
| No. 2 | 1.19 | 1.67 | 0.50 | 18.67 | 4.297 | 142 | NM* | −36 | 1384 |
| No. 3 | 0.80 | 2.24 | 0.95 | 19.01 | 4.290 | 136 | 7.9 | −51 | 1581 |
| No. 4 | 1.28 | 1.46 | 0.42 | 18.76 | 4.324 | 143 | 7.0 | −32 | 1480 |
| No. 5 | 1.06 | 2.20 | 0.60 | 18.85 | 4.313 | 141 | NM* | −38 | 1430 |
| No. 6 | 0.75 | 2.21 | 0.88 | 18.99 | 4.303 | 138 | 8.0 | −50 | 1558 |
| No. 7 | 1.55 | 2.14 | 0.76 | 49.66 | 8.764 | 156 | 1.6 | −19 | 26272 |

TABLE 3-continued

| Example | BP/BI | Internal Alkyl | 5+ Methyl | KV40, cSt | KV100, cSt | VI | Noack, wt % | Pour Point (° C.) | CCS at −35° C., cP |
|---|---|---|---|---|---|---|---|---|---|
| No. 8 | 1.30 | 2.57 | 1.17 | 49.99 | 8.744 | 154 | 1.6 | −24 | 11278 |
| No. 9 | 0.94 | 3.56 | 1.37 | 50.76 | 8.730 | 151 | 1.7 | −34 | 10769 |
| No. 10 | 1.41 | 2.75 | 1.14 | 48.93 | 8.642 | 156 | 1.9 | −22 | 124967 |
| No. 11 | 1.18 | 3.03 | 1.18 | 49.09 | 8.597 | 154 | 2.3 | −28 | 18252 |
| No. 12 | 0.95 | 2.94 | 1.29 | 49.44 | 8.533 | 150 | 2.2 | −35 | 8589 |

*NM: not measured

Comparative GTL and PAO Base Stocks

Characterization results of comparable GTL and PAO samples used in FIGS. 1-4 are summarized in Table 4. GTL comparative examples shown in the following publications: GTL #1 WO2007068795, GTL#2 WO2007068795, GTL#3 US2005007720. The PAO comparative examples were measured using the techniques described above on commercially available samples.

TABLE 4

| Samples | BP/BI | Internal Alkyl | 5+ Methyl | KV40, cSt | KV100, cSt | VI | Noack, wt % | Pour Point (° C.) | CCS at −35° C., cP |
|---|---|---|---|---|---|---|---|---|---|
| GTL #1 | 0.46 | 2 | 2 | | | | | | |
| GTL #2 | 0.23 | 4 | 2 | | | | | | |
| GTL #3 | 1.57 | 1.86 | 1.75 | 23.62 | 5.488 | 182 | | −9 | |
| C10 PAO #1 | 0.91 | 1.03 | 0.00 | 16.60 | 3.831 | 124 | 13.6 | <−60 | 1435 |
| C10 PAO #2 | 0.91 | 0.90 | 0.00 | 16.77 | 3.828 | 121 | 14.1 | <−60 | 1117 |
| C10 PAO #3 | 0.77 | 1.52 | 0.14 | 16.61 | 3.809 | 119 | 14.8 | <−60 | 1192 |
| C10 PAO #4 | 0.94 | 0.77 | 0.00 | 16.59 | 3.803 | 121 | 12.6 | <−60 | 1324 |
| C10 PAO #5 | 0.77 | 1.82 | 0.18 | 46.33 | 7.746 | 136 | 3.7 | <−60 | |
| C10 PAO #6 | 0.93 | 0.99 | 0.05 | 46.50 | 7.795 | 136 | 3.4 | <−60 | |
| C12 PAO #1 | 1.30 | 0.43 | 0.00 | 23.71 | 4.990 | 141 | 6.5 | −47 | 2260 |
| C12 PAO #2 | 1.40 | 0.55 | 0.00 | 39.05 | 7.139 | 147 | 3.2 | −42 | |

When the foregoing data is depicted graphically, the important structural and property differences of the hydrocarbon mixtures of the present invention, as compared to prior art hydrocarbon mixtures, are clearly seen and support the surprisingly improved properties of the present hydrocarbon mixtures. FIGS. 1-4 graphically depict several of the above characterizations.

FIG. 1 illustrates the relationship between BP/BI and Internal Alkyl Branches per Molecule for the various hydrocarbon mixtures. The straight line in the plot depicts the equation of BP/BI −0.6037 (Internal alkyl branching per molecule)+2.0. All of the hydrocarbon mixtures of the present invention are above the line. While a few of the prior art hydrocarbon mixtures are also above the line, they do not meet other important characteristics of the present hydrocarbon mixtures, as shown in FIGS. 2-4.

Figure 2:
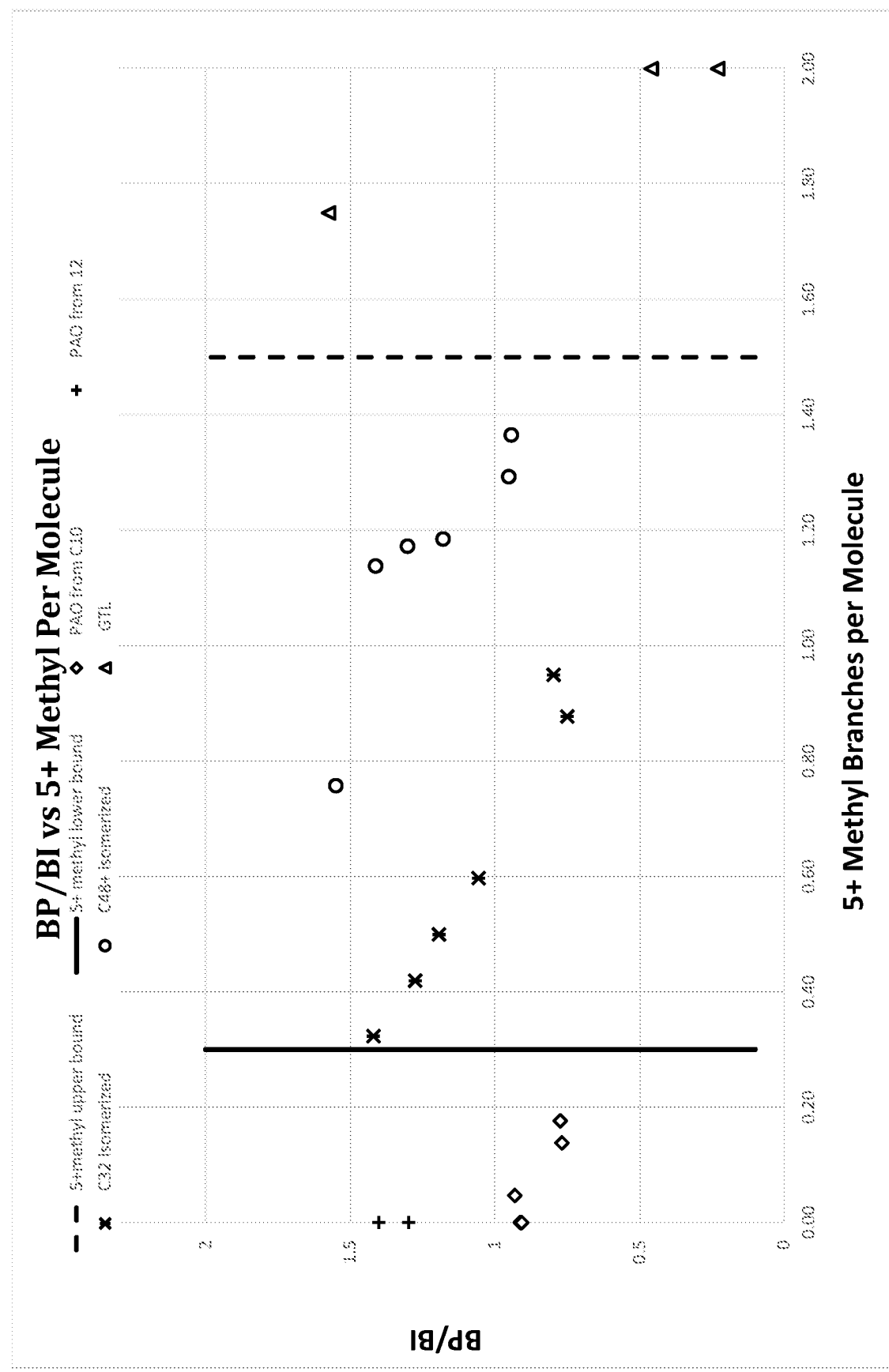
FIG. 2 illustrates the relationship between BP/BI and 5+ Methyl Branches per Molecule for various hydrocarbons, including low-viscosity PAO manufactured from 1-decene and 1-dodecene, GTL base oils, and hydroisomerized hexadecene oligomers. It demonstrates that the 5+ Methyl Branches per Molecules for the hydrocarbon mixtures disclosed in this patent fall in a unique range of 0.3-1.5.

FIG. 2 illustrates the relationship between BP/BI and 5+ Methyl Branches per Molecule for the various hydrocarbon mixtures. It demonstrates that the 5+ Methyl Branches per Molecules for the present hydrocarbon mixtures fall in a unique range of 0.3-1.5. All of the prior art mixtures fall outside the range.

FIGS. 3 and 4 illustrate the relationship between NOACK volatility and CCS at −35° C. for the various hydrocarbon mixtures. Some commercially available Group III base oils, which do not meet the requirement of 80% even carbon number by FIMS, are additionally included. The solid line and dotted line depicts the upper limit and lower limit of the Noack vs. CCS at −35° C. exhibited by the present unique hydrocarbon mixture, which are NOACK=2,750 (CCS at −35° C.)$^{(-0.8)}$+2 and NOACK=2,750 (CCS at −35° C.)$^{(-0.8)}$−2, respectively. It can be seen that all of the present hydrocarbon mixtures fall within the range, whereas essentially all of the prior art samples fall outside of the range with the exception of a PAO of a higher viscosity that does not have the desired branching as seen in FIGS. 1 and 2. FIG. 4 is an enlarged view of FIG. 3 in the range of 800-2,800 cP of CCS at −35° C. In general, for an engine oil formulation, a preferable base stock will fall as close as possible to the origin of FIGS. 3 and 4, as a lower Noack volatility for a given CCS viscosity at −35° C. is ideal for modern engine oil formulations such as 0W-20 through 0W-8 formulations.

The foregoing data and figures demonstrate the unique branching characteristics of the present hydrocarbon mixture, as characterized by NMR, and the resulting unique properties. The novel combination of structural characteristics has been found to lead to outstanding properties, including extremely low volatility and good low-temperature properties, which are important performance attributes of high quality base stocks.

That which is claimed is:

1. A hydrocarbon mixture in which:
   a. the percentage of molecules with even carbon number is ≥80% according to FINIS;
   b. the BP/BI≥−0.6037 (Internal alkyl branching per molecule)+2.0;

c. on average there are 0.3 to 1.5 5+methyl per molecule; and d. has a Noack volatility and Cold Crank Simulated viscosity at −35° C. relationship where Noack volatility is between 2750 (CCS at −35° C.)$^{(-0.8)}$±2.

2. The mixture of claim 1, wherein the mixture further has a Noack volatility and Cold Crank Simulated viscosity at −35° C. relationship where Noack volatility is between 2750 (CCS at −35° C.)$^{(-0.8)}$+0.5 and 2740 (CCS at −35° C.)$^{(-0.8)}$−2.

3. The hydrocarbon mixture of claim 1 further comprising the following characteristics:

e. KV100 in the range of 3.0-10.0 cSt; and f. Pour point in the range of −20 to −55° C.

4. The hydrocarbon mixture of claim 3, wherein the carbon numbers of the hydrocarbon mixture is in the range of 28 to 40 and the hydrocarbon mixture further exhibits the following characteristics:

a. KV100 in the range of 3.0-6.0 cSt;

b. VI in the range of 11 ln(BP/BI)+135 to 11 ln(BP/BI)+145; and c. Pour point in the range of 33 ln(BP/BI)-45 to 33 ln(BP/BI)-35.

5. The hydrocarbon mixture of claim 4, wherein the boiling point range is no more than 125° C. (TBP at 95%-TBP at 5%) as measured by ASTM D2887.

6. The hydrocarbon mixture of claim 4, wherein the boiling point range is no more than 50° C. (TBP at 95%-TBP at 5%) as measured by ASTM D2887.

7. The hydrocarbon mixture of claim 4, wherein its Branching proximity is in the range of 14-30 and Branching index is in the range of 15-25.

8. The hydrocarbon mixture of claim 4, wherein its KV100 is in the range of 3.2 to 5.5 cSt.

9. The hydrocarbon mixture of claim 4, wherein its VI is in the range of 135 to 145.

10. The hydrocarbon mixture of claim 4, wherein its pour point is in the range of −25 to −55° C.

11. The hydrocarbon mixture of claim 4, wherein its Noack volatility is less than 16 wt %.

12. The hydrocarbon mixture of claim 3, wherein its CCS viscosity at −35° C. is less than 2,000 cP.

13. The mixture according to claim 3, wherein said hydrocarbon mixture has carbon numbers≥42 and the following characteristics:

a. KV100 in the range of 6.0-10.0 cSt;

b. VI in the range of 11 ln(BP/BI)+145 to 11 ln(BP/BI)+160; and a c. Pour point in the range of 33 ln(BP/BI)-40 to 33 ln(BP/BI)-25.

14. The hydrocarbon mixture of claim 13, wherein its BP is in the range of 16-30 and BI is in the range of 15-25.

15. The hydrocarbon mixture of claim 13, wherein its KV100 is in the range of 8.0-10.0 cSt.

16. The hydrocarbon mixture of claim 13, wherein its VI is in the range of 140-170.

17. The hydrocarbon mixture of claim 13, wherein its pour point is in the range of −15 to −50° C.

18. A lubricant composition comprising the hydrocarbon mixture of claim 1 as the base stock component at 1-99 wt %, and one or more additives selected from antioxidants, viscosity modifiers, pour point depressants, foam inhibitors, detergents, dispersants, dyes, markers, rust inhibitors or other corrosion inhibitors, emulsifiers, de-emulsifiers, flame retardants, antiwear agents, friction modifiers, thermal stability improvers, or multifunctional additives.

19. The lubricant composition of claim 18, formulated for use in two cycle engines; for use as a transmission fluid; for use as a hydraulic fluid; for use in compressors; for use in turbines; for use in an automotive engine oil; for use as a marine grade lubricant; for use as a grease; for use as an industrial oil; for use as a dielectric heat transfer fluid; or for use as a process oil.

\* \* \* \* \*